(12) United States Patent
Oh

(10) Patent No.: US 11,644,792 B2
(45) Date of Patent: May 9, 2023

(54) METHOD FOR GENERATING HOLOGRAM

(71) Applicant: ELECTRONICS AND TELECOMMUNICATIONS RESEARCH INSTITUTE, Daejeon (KR)

(72) Inventor: Kwan-Jung Oh, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 170 days.

(21) Appl. No.: 16/951,391

(22) Filed: Nov. 18, 2020

(65) Prior Publication Data

US 2021/0149340 A1 May 20, 2021

(30) Foreign Application Priority Data

Nov. 19, 2019 (KR) .......................... 10-2019-0148880
Nov. 16, 2020 (KR) .......................... 10-2020-0152541

(51) Int. Cl.
*G03H 1/22* (2006.01)
*G03H 1/08* (2006.01)

(52) U.S. Cl.
CPC ......... *G03H 1/2249* (2013.01); *G03H 1/0866* (2013.01); *G03H 1/2294* (2013.01);
(Continued)

(58) Field of Classification Search
CPC ........... G03H 2222/22; G03H 2222/23; G03H 2222/20; G03H 2001/2271; G03H 1/2249; G03H 2001/0875; G03H 1/0866; G03H 1/0443; G03H 2001/0452; G03H 2001/0458; G03H 1/2294; G03H 1/26; G03H 2001/2675; G03H 2001/2665; G03H 2210/30; G03H 2226/04;
(Continued)

(56) References Cited

U.S. PATENT DOCUMENTS 9,869,971 B2   1/2018  Chang et al.
10,775,540 B2  9/2020  Song et al.
(Continued)

FOREIGN PATENT DOCUMENTS

KR       10-1081001 B1    11/2011
KR    10-2016-0081527 A    7/2016
(Continued)

OTHER PUBLICATIONS

Antonin Filles, et al. "Computer Generated Hologram From Multiview-Plus-Depth Data Considering Specular Reflections", 2016 IEEE International Conference on Multimedia & Expo Workshops (ICMEW).

*Primary Examiner* — Jade R Chwasz
(74) *Attorney, Agent, or Firm* — LRK Patent Law Firm

(57) ABSTRACT

A method of generating a hologram includes receiving an input image representing a 3D object, defining a first phase value for a first pixel data such that spatio-temporally identical pixels with respect to the input image have the same phase, defining a second phase value for a second pixel data such that spatio-temporally identical pixels with respect to the input image have the same phase, and generating a multi-view hologram using the first phase value and the second phase value.

10 Claims, 12 Drawing Sheets

(52) U.S. Cl.
CPC . *G03H 2001/2271* (2013.01); *G03H 2210/30* (2013.01); *G03H 2226/04* (2013.01)

(58) Field of Classification Search
CPC ... G03H 2001/2239; G03H 2001/2242; G03H 2001/2297; G03H 2225/60; G03H 1/0808; G03H 2210/452; G03H 2210/454; G03H 2226/02
USPC .......................................................... 359/9
See application file for complete search history.

(56) References Cited

U.S. PATENT DOCUMENTS

| | | |
|---|---|---|
| 2014/0085692 A1 | 3/2014 | Lee et al. |
| 2016/0187850 A1* | 6/2016 | Oh ..................... H04N 19/124 359/9 |
| 2018/0063519 A1* | 3/2018 | Smithwick ............ G02B 30/24 |

FOREIGN PATENT DOCUMENTS

| | | |
|---|---|---|
| KR | 10-2016-0104363 A | 9/2016 |
| KR | 10-2016-0142626 A | 12/2016 |
| KR | 10-2144338 B1 | 8/2020 |

\* cited by examiner

10

METHOD FOR GENERATING HOLOGRAM

CROSS-REFERENCE TO RELATED APPLICATION

This application claims priority to and the benefit of Korean Patent Application No. 10-2019-0148880 filed in the Korean Intellectual Property Office on Nov. 19, 2019 and Korean Patent Application No. 10-2020-0152541 filed in the Korean Intellectual Property Office on Nov. 16, 2020, the entire contents of which are incorporated herein by reference.

BACKGROUND OF THE DISCLOSURE

1. Field of the Invention

The present disclosure relates to a method for generating a hologram.

2. Description of Related Art

Holography is a technology that uses diffraction and interference of light. Unlike conventional 2D images that record only the amplitude information of light, holography can utilize even the phase information of light. Accordingly, holography can provide a perfect three-dimensional (3D) image, such as viewing a real object. Recently, researches on digital hologram technology, which generates a hologram using a computer generated hologram (CGH) on a general image (or input image), are being actively conducted.

The digital hologram can be optically reconstructed by a spatial light modulator (SLM). SLM receives the amplitude information and phase information of a hologram in the form of a 2D digital image and spatially reproduces it. At this time, the viewing angle of the hologram is dependent on the pixel pitch size of the hologram and the SLM, and the smaller the pixel pitch, the larger the viewing angle is provided. However, it is very difficult to manufacture an SLM with a pixel pitch small enough to provide a large viewing angle. Accordingly, a lot of research is being conducted on methods to spatio-temporally increase reproduction space of a hologram by using a plurality of SLMs, and in this case, it is possible to create and reproduce a plurality of spatio-temporal holograms.

The present disclosure is based on the work conducted with the support by Giga-KOREA project (GK19D0100, Development of Telecommunications Terminal with Digital Holographic Table-top Display).

The above information disclosed in this Background section is only for enhancement of understanding of the background of the disclosure, and therefore it may contain information that does not form the prior art that is already known in this country to a person of ordinary skill in the art.

SUMMARY OF THE DISCLOSURE

The present disclosure has been made in an effort to provide a method for generating a hologram having advantages of increasing the correlation between spatio-temporally continuous holograms, that is, the spatio-temporal correlation.

Here, the spatio-temporal correlation is a concept that includes both temporal correlation and correlation among viewpoints, and is an expression commonly used in multi-view images. Specifically, the temporal correlation refers to a correlation based on the similarity between consecutive frames for one viewpoint, and the correlation among viewpoints refers to a correlation based on the similarity between frames of adjacent viewpoints for a multi-view case, where the term multi-view includes a single-view with one viewpoint or a plurality of views with two or more viewpoints. That is, the spatio-temporal correlation refers to a correlation based on similarity between temporally adjacent frames or similarity between adjacent frames among viewpoints for a multi-view case.

According to an embodiment of the present disclosure, a method for generating a hologram may include: receiving an input image representing a 3D object; defining a first phase value for a first pixel data such that spatio-temporally identical pixels with respect to the input image have the same phase; defining a second phase value for a second pixel data such that spatio-temporally identical pixels with respect to the input image have the same phase; and generating a multi-view hologram using the first phase value and the second phase value.

The first pixel data may include a first 3D coordinate information representing the 3D object, and a first RGB pixel information representing the 3D object, and the first phase value.

The second pixel data may include a second 3D coordinate information representing the 3D object, and a second RGB pixel information representing the 3D object, and the second phase value.

The multi-view hologram may include a single-view hologram.

The defining the first phase value may include applying a first random phase to the first pixel data.

The defining the second phase value may include applying a second random phase to the second pixel data.

The first random phase and the second random phase may be set such that the first phase value and the second phase value are the same, when the first random phase and second random phase are applied to the first pixel data and the second pixel data.

The method of generating a hologram may further include generating a correlation image by assigning a first value to the spatio-temporally identical pixels and a second value to pixels that are not spatio-temporally identical.

The method of generating a hologram may further include compressing the multi-view hologram using the correlation image.

Identical pixels among viewpoints are determined based on a depth image in an RGBD-based hologram generation method.

According to an embodiment of the present disclosure, a method for generating a hologram may include: receiving an input image representing a 3D object; generating a first pixel data comprising a first phase information at a first viewpoint for the input image; generating a second pixel data comprising a second phase information at a second viewpoint for the input image; and generating a multi-view hologram using the first pixel data and the second pixel data.

The first pixel data may include a first 3D coordinate information representing the 3D object at the first viewpoint, and a first RGB pixel information representing the 3D object at the first viewpoint, and the first phase information.

The second pixel data may include a second 3D coordinate information representing the 3D object at the second viewpoint, and a second RGB pixel information representing the 3D object at the second viewpoint, and the second phase information.

The method of generating a hologram may further include, for the identical pixels between the first viewpoint and the second viewpoint, allocating the same phase value to the first phase information of the first pixel data and the second phase information of the second pixel data That, how to create a hologram.

The method of generating a hologram may further include, when the first viewpoint and the second viewpoint are adjacent viewpoints, generating a correlation image by assigning a first value to the identical pixels between the first viewpoint and the second viewpoint, and a second value to pixels that are not identical between the first viewpoint and the second viewpoint.

The method of generating a hologram may further include compressing the multi-view hologram by using the correlation image.

According to an embodiment of the present disclosure, a method for generating a hologram may include: receiving an input image representing a 3D object; applying a first random phase to a first pixel data of a first viewpoint for the input image; applying a second random phase to a second pixel data of a second viewpoint for the input image; and generating a multi-view hologram using the first pixel data and the second pixel data.

The method of generating a hologram may further include performing random phase modulation such that a result of applying the first random phase and the second random phase for the identical pixels between the first viewpoint and the second viewpoint becomes the same phase value.

The method of generating a hologram may further include, when the first viewpoint and the second viewpoint are adjacent viewpoints, generating a correlation image by assigning a first value to the identical pixels between the first viewpoint and the second viewpoint, and a second value to pixels that are not identical between the first viewpoint and the second viewpoint.

The method of generating a hologram may further include compressing the multi-view hologram by using the correlation image.

DETAILED DESCRIPTION OF THE EMBODIMENTS

Figure 1:
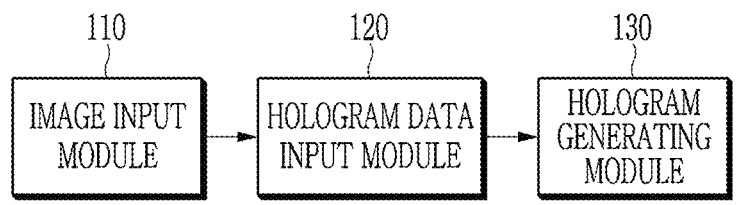
FIG. 1 is a block diagram illustrating an apparatus for generating a hologram according to an embodiment of the present disclosure.

Hereinafter, embodiments of the present disclosure will be described in detail with reference to the accompanying drawings so that those of ordinary skill in the art may easily implement the present disclosure. However, the present disclosure may be implemented in various different ways and is not limited to the embodiments described herein. In the drawings, parts irrelevant to the description are omitted in order to clearly describe the present disclosure, and like reference numerals are assigned to like elements throughout the specification.

Throughout the specification and claims, unless explicitly described to the contrary, the word "comprise", and variations such as "comprises" or "comprising", will be understood to imply the inclusion of stated elements but not the exclusion of any other elements. In addition, terms such as " . . . unit", " . . . group", and "module" described in the specification mean a unit that processes at least one function or operation, and it can be implemented as hardware or software or a combination of hardware and software.

FIG. 1 is a block diagram illustrating an apparatus for generating a hologram according to an embodiment of the present disclosure.

Referring to FIG. 1, the apparatus 10 for generating a hologram according to an embodiment of the present disclosure may receive an input image representing a 3D object and generate a hologram for the input image.

Holography is a kind of 3D spatial expression technology that has no limit of field of view and almost no three-dimensional fatigue, as objects are reproduced in a three-dimensional space by adjusting the amplitude and phase of light. The hologram can be displayed in a three-dimensional space by using the interference pattern of the object wave and the reference wave, and using a device capable of simultaneously controlling the amplitude and phase of light such as a complex SLM, real-time high-resolution hologram can be implemented. Recently, CGH technology that can provide a hologram on a flat display by processing an interference pattern for reproducing a holographic video is also utilized.

CGH technology can generate holograms by approximating optical signals and calculating interference patterns generated through mathematical operations. For example, based on the fact that a 3D object is composed of a set of 3D points, CGH technology calculates and superimposes a point hologram corresponding to each of all 3D points constituting a 3D object, so that a complete hologram can be expressed. Hereinafter, this method will be referred to as a point cloud-based hologram generation method. As another example, a plurality of CGH images can be generated for each layer according to depth information of 3D object, and a hologram image may be expressed from them, and hereinafter, this method will be referred to as an RGBD(RGB Depth)-based hologram generation method. In addition, as a method of generating a hologram, there are a mesh-based hologram generation method or a light field-based hologram generation method, etc., and although the following is primarily to explain the point cloud-based hologram generation method and RGBD-based hologram generation method, it is apparent that embodiments of the present invention can be applied to various hologram generation methods such as the mesh-based hologram generation method or the light field-based hologram generation method.

In the present embodiment, the apparatus 10 for generating a hologram may generate a multi-view hologram to represent a 3D object. To this end, the apparatus 10 for generating a hologram may include an image input module 110, a hologram data input module 120, and a hologram generating module 130.

From a hologram perspective, multi-views can mean several viewpoints that are spatially or temporally distinguished, for example, viewpoints when a spatial multiplexing is applied using a plurality of SLMs, or viewpoints when a temporal multiplexing is applied using an SLM that can operate at high speed. However, in the present specification, the term multi-view may also include the concept of a multi-view in terms of an input image in which a 3D object is expressed. For example, it may mean a multi-view when a 3D image is expressed using two or more viewpoints. Meanwhile, in the present specification, the term multi-view may include one or more viewpoints.

The image input module 110 may receive an input image representing a 3D object and transmit it to the hologram data input module 120. Here, the 3D object may include a visible or invisible area according to a viewpoint.

The hologram data input module 120 may generate pixel data for generating a hologram for the input image received by the image input module 110. Here, the pixel data may have various structures that are not limited to a specific structure. For example, the pixel data may have a structure including 3D coordinate information representing a 3D object and RGB pixel information corresponding thereto. As another example, the pixel data may have a complex value structure having a real part for expressing the intensities of a 3D object and an imaginary part for expressing the phase, but the scope of the present disclosure is not limited thereto.

The hologram data input module 120 may define a phase value in the structure of the pixel data as described above. Specifically, the hologram data input module 120 may define a phase value for each pixel data corresponding to each of the plurality of pixels of the hologram.

Specifically, the hologram data input module 120 may define a phase value for the pixel data so that spatio-temporally identical pixels have the same phase. Here, spatio-temporally identical pixels may mean pixels having the same three-dimensional absolute coordinates. In addition, spatio-temporally identical pixels may mean identical pixels among viewpoints. For example, spatio-temporally identical pixels may include pixels that can be continuously viewed in time for the input image representing the 3D object, or pixels that can be continuously viewed from a first viewpoint and a second viewpoint for the input image representing the 3D object. The hologram data input module 120 may define phase values in the pixel data so that the spatio-temporally identical pixels have the same phase as described above.

The hologram generation module 130 may generate a hologram capable of increasing a spatio-temporal correlation by using pixel data including phase values defined by the hologram data input module 120.

Figure 2:
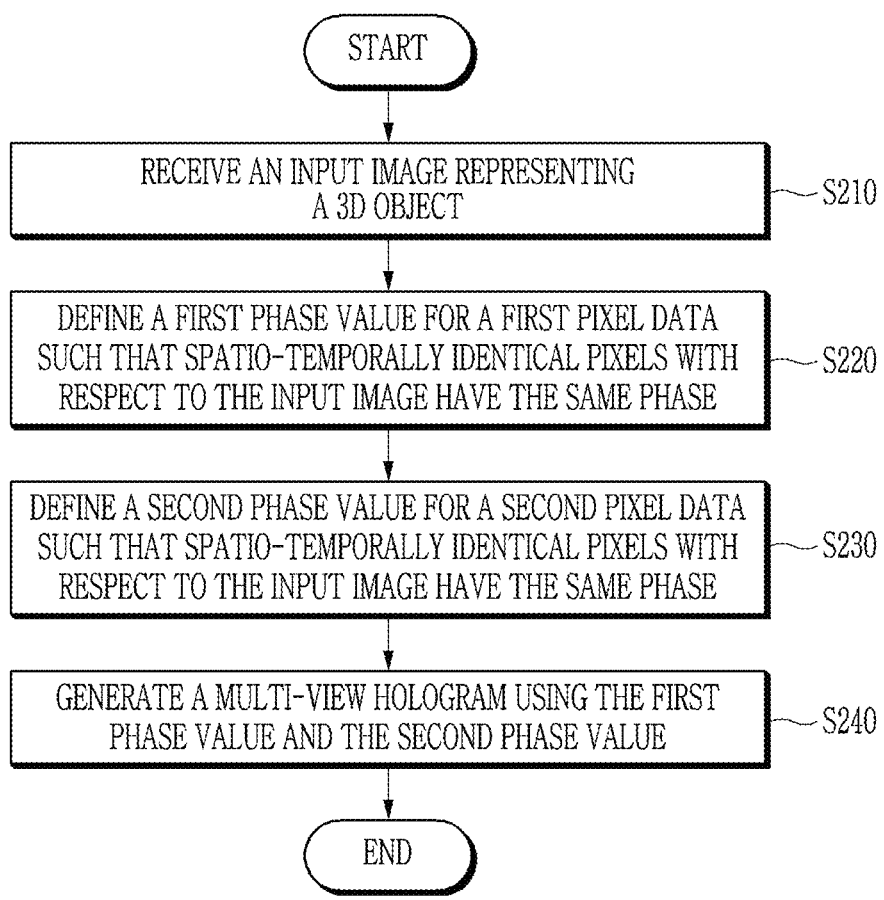
FIG. 2 is a flowchart illustrating a method of generating a hologram according to an embodiment of the present disclosure.

FIG. 2 is a flowchart illustrating, based on FIG. 1, a method of generating a hologram according to an embodiment of the present disclosure.

Referring to FIG. 2, a method of generating a hologram according to an embodiment of the present disclosure may include receiving an input image representing a 3D object (S210).

In addition, the method may include defining a first phase value for a first pixel data so that spatio-temporally identical pixels with respect to the input image have the same phase (S220).

In addition, the method may include defining a second phase value for a second pixel data so that spatio-temporally identical pixels with respect to the input image have the same phase (S230).

That is, in a hologram that continuously moves in time or a hologram viewed as a multi-view, pixel data of pixels identified as being absolutely identical may have the same phase value. For example, pixel data of pixels identified as having the same three-dimensional absolute coordinates may be processed to have the same phase value.

In addition, the method may include generating a multi-view hologram using the first phase value and the second phase value (S240). Here, the multi-view hologram may include a single-view hologram.

According to the embodiments of FIGS. 1 and 2, in order to solve the problem of having a low correlation even between spatio-temporally consecutive holograms, when a hologram is generated from a 3D image, by defining the same phase value in the spatio-temporally identical pixels, the correlation between spatio-temporally continuous holograms can be increased. Specifically, by using the phase value, the correlation between temporally continuous holograms for one viewpoint, that is, the temporal correlation, can be increased, or the correlation between holograms of adjacent viewpoints for a multi-view, that is, the correlation among viewpoints can be increased.

In addition, according to an embodiment of the present disclosure, as the correlation between spatio-temporally continuous holograms increases, the hologram compression rate can be greatly improved by using this for hologram compression. For example, in multi-view hologram compression, a correlation image is generated by discriminating between identical pixels among viewpoints and pixels that are not identical among viewpoints, and the correlation image is used for compression, thereby improving the hologram compression rate.

Figure 3:
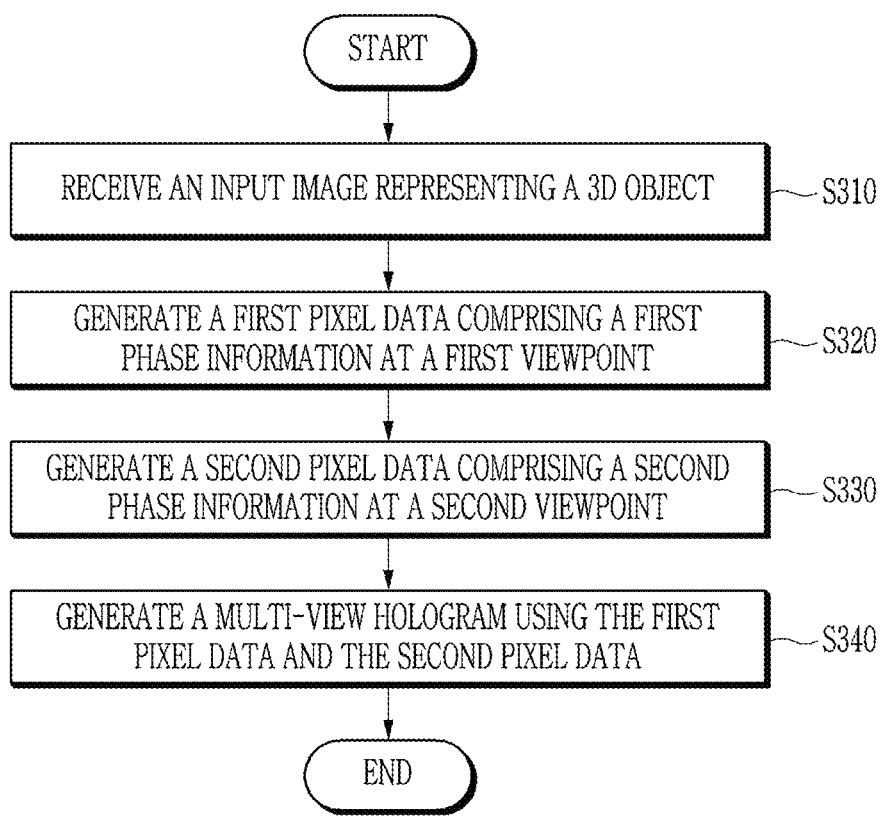
FIG. 3 to FIG. 5 are diagrams illustrating a method of generating a hologram according to an embodiment of the present disclosure.
Figure 4:
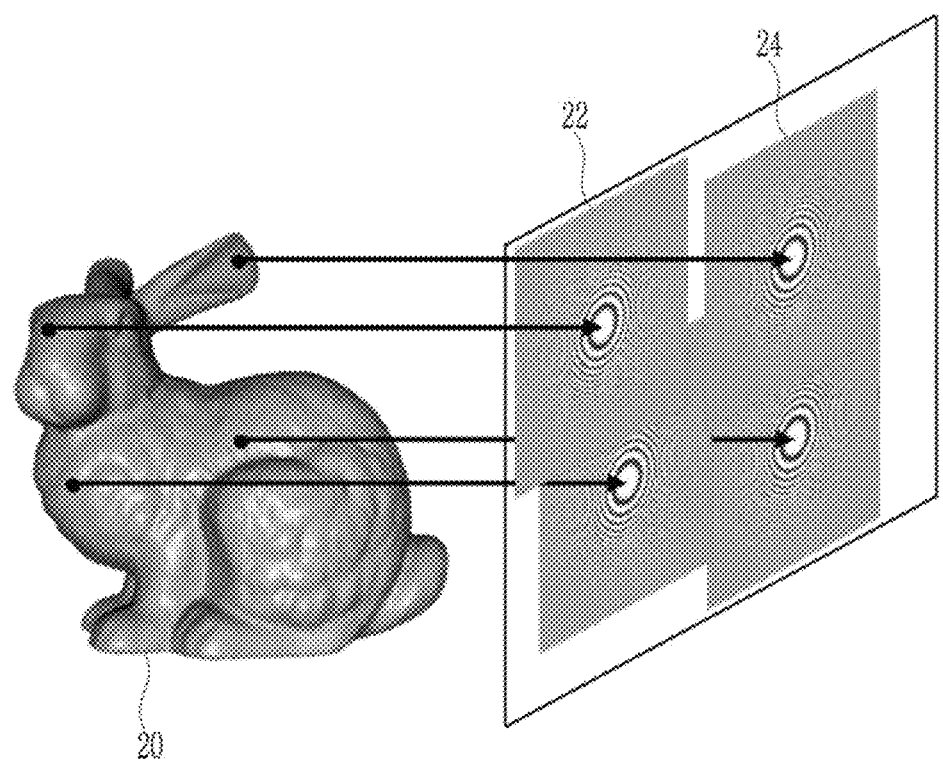
Figure 5:
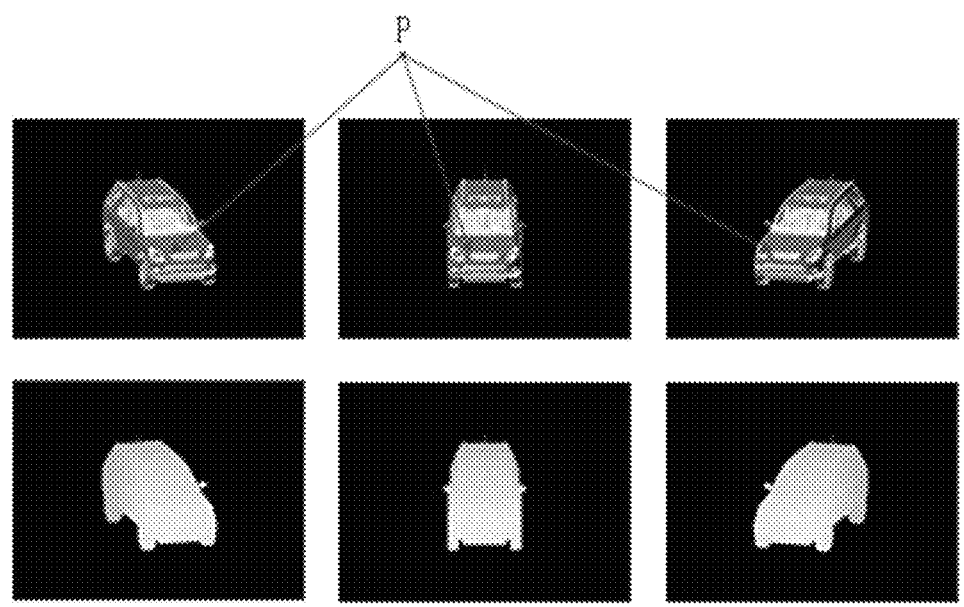

FIG. 3 to FIG. 5 are diagrams illustrating a method of generating a hologram according to an embodiment of the present disclosure.

Referring to FIG. 3, a method for generating a hologram according to an embodiment of the present disclosure may include receiving an input image representing a 3D object (S310).

In addition, the method may include generating a first pixel data including a first phase information at a first viewpoint for the input image (S320). That is, the first pixel data may include a first 3D coordinate information representing the 3D object at a first viewpoint, a first RGB pixel information representing the 3D object at a first viewpoint, and first phase information.

In addition, the method may include generating a second pixel data including a second phase information at a second viewpoint for the input image (S330). That is, the second pixel data may include a second 3D coordinate information representing the 3D object at a second viewpoint, a second RGB pixel information representing the 3D object at a second viewpoint, and second phase information.

Here, the first viewpoint and the second viewpoint may be spatio-temporally different viewpoints. In addition, the first viewpoint and the second viewpoint may be adjacent to each other, that is, spatio-temporally continuous different viewpoints.

In this case, the first phase information of the first pixel data and the second phase information of the second pixel data may be assigned to the same phase value for the identical pixels between the first viewpoint and the second viewpoint.

In addition, the method may include generating a multi-view hologram using the first pixel data and the second pixel data (S340).

Referring to FIG. 4, in the point cloud-based hologram generation method, a hologram is generated by creating a hologram 22, 24 for each point from a 3D object 20 composed of a plurality of points and overlapping them.

Referring to FIG. 5, a case in which multiple viewpoints are extracted for one object and a hologram is generated for each viewpoint. A 3D object may have a newly visible area depending on the viewpoint, or there may be an area visible from all viewpoints. For example, a point marked P is a point visible from all three viewpoints.

However, when the hologram is generated in consideration of the random phase, since the random phase is independently applied to each viewpoint, the phase value of the point indicated by P is different even though the magnitude value is the same, so that a spatio-temporal correlation between the independently generated holograms can be broken.

In order to maintain the spatio-temporal correlation between the independently generated holograms, for example, a common point denoted by P may be expressed with the same phase value. For example, the conventional point cloud data representation includes only 3D coordinate information and RGB pixel information, but phase information is added to it. In addition, when holograms for multiple viewpoints are generated from a point cloud, the same phase value is assigned to phase information for the same three-dimensional absolute coordinates, thereby generating a multi-view hologram in which the spatio-temporal correlation is maintained.

(x, y, z, R, G, B)→(x, y, z, R, G, B, phase)

Here, x, y, and z denote 3D coordinate information, R, G, and B denote RGB pixel information, and phase denotes phase information.

FIG. 6 to FIG. 9C are diagrams illustrating a method of generating a hologram according to an embodiment of the present disclosure.

Figure 6:
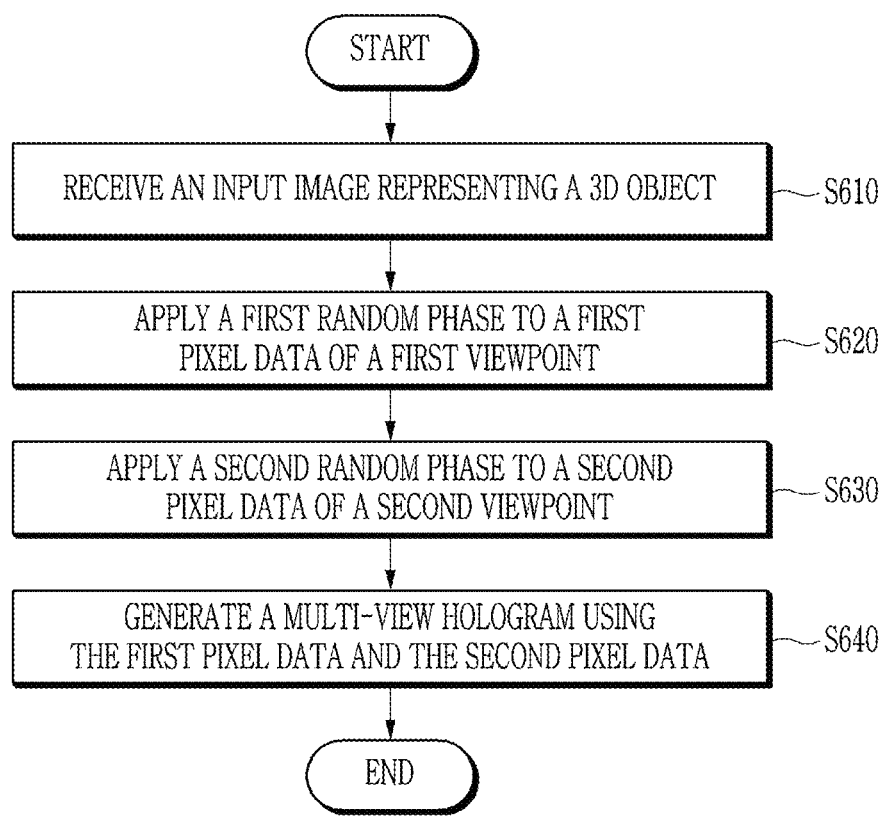
FIG. 6 to FIG. 9C are diagrams illustrating a method of generating a hologram according to an embodiment of the present disclosure.

Referring to FIG. 6, a method of generating a hologram according to an embodiment of the present disclosure may include receiving an input image representing a 3D object (S610).

In addition, the method may include applying a first random phase to a first pixel data of a first view for the input image (S620).

In addition, the method may include applying a second random phase to a second pixel data of a second view for the input image (S630).

Here, the first viewpoint and the second viewpoint may be spatio-temporally different viewpoints. In addition, the first viewpoint and the second viewpoint may be adjacent to each other, that is, spatio-temporally continuous different viewpoints.

In this case, random phase modulation may be performed so that a result of applying the first random phase and the second random phase for the identical pixels between the first viewpoint and the second viewpoint becomes the same phase value.

In addition, the method may include generating a multi-view hologram using the first pixel data and the second pixel data (S640).

Figure 7:
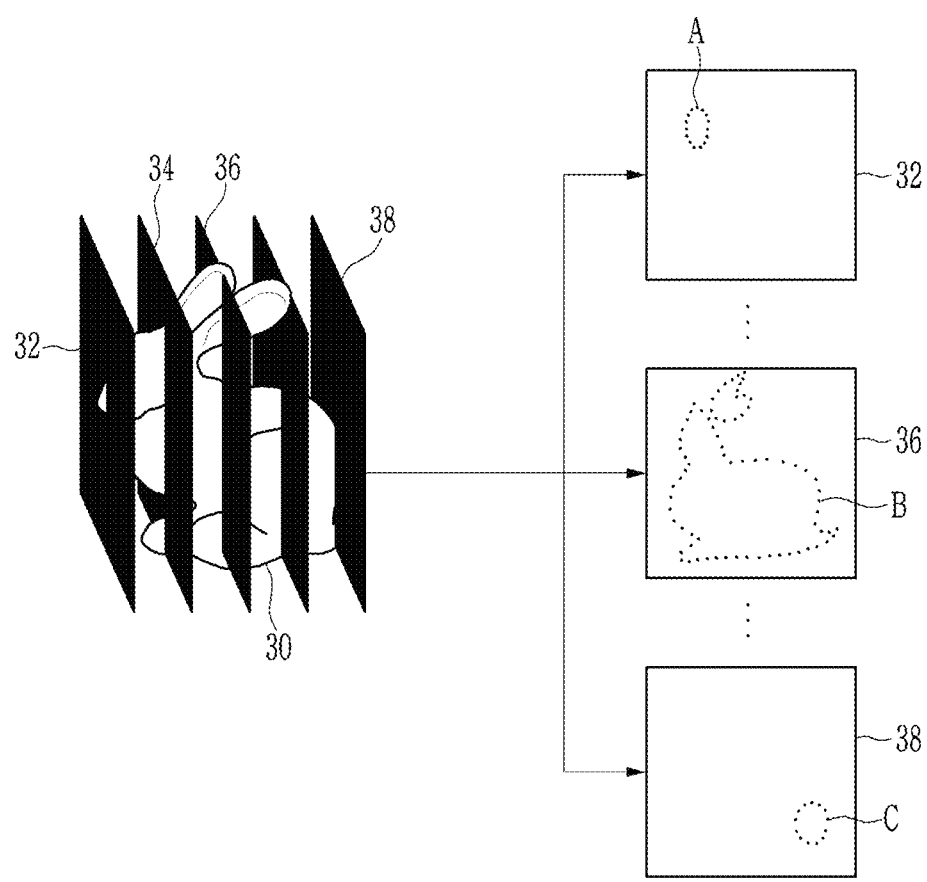

Referring to FIG. 7, in the RGBD-based hologram generation method, a 3D object 30 may be divided into several layers 32, 34, 36, and 38 to generate a hologram based on layers. For example, according to the depth D, a hologram for the cross section A corresponding to the layer 32 may be generated, a hologram for the cross section B corresponding to the layer 36 may be generated, and a hologram for the cross section C corresponding to the layer 38 may be generated.

Figure 8A:
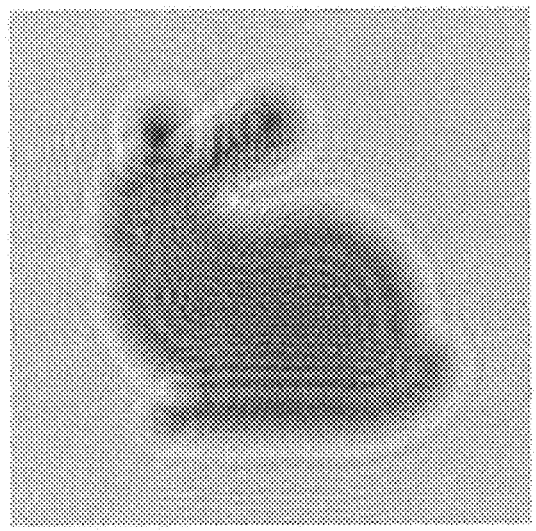
Figure 8B:
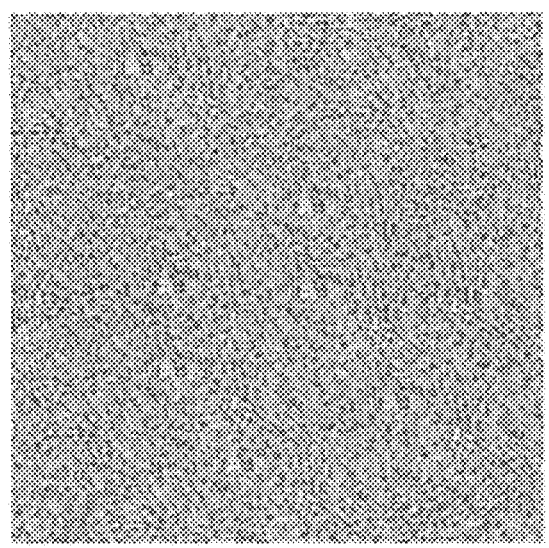

Subsequently, referring to FIG. 8A and FIG. 8B, random phase modulation to which a random phase is additionally applied to pixels may be performed. Random phase modulation expresses the surface of the object roughly finely, so that the effect of spreading light reaching the surface of the object in several directions can occur. In the case of a hologram, considering the random phase, it is possible to observe the hologram with uniform image quality within a given viewing angle. On the other hand, if the random phase is not considered, it is possible to observe the hologram in the axial direction, but it becomes difficult to observe the hologram as it goes to the outer area within the viewing angle. In addition, the random phase can increase the effect of accommodation, which is one of the main characteristics of the hologram. However, the random phase may cause speckle noise and may deteriorate the spatial correlation of the hologram itself.

For random phase modulation, a phase may be given for each intensity value for each pixel or point. In general random phase modulation, a phase value in the range of 0 to $2\alpha$ can be randomly assigned. FIG. 8A illustrates a hologram to which a random phase is not applied, and FIG. 8B illustrates a hologram to which a random phase is applied.

Such random phase modulation can be applied to not only the RGBD-based hologram generation method, but also the point cloud-based hologram generation method, the mesh-based hologram generation method, and the light field-based hologram generation method as described above.

Figure 9A:
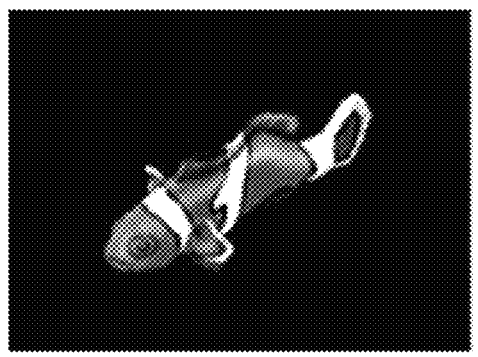
Figure 9B:
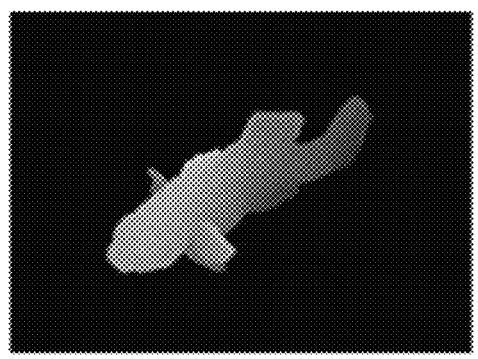
Figure 9C:
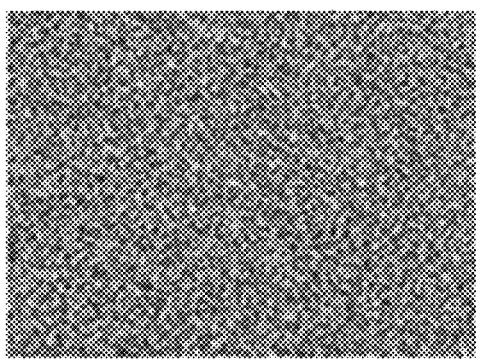

Next, referring to FIG. 9C, in the RGBD-based hologram generation method, a random phase is defined as shown in FIG. 9C, and a hologram is generated so that the same pixel at different viewpoints has the same phase value, thereby generating a multi-view hologram, it is possible to maintain a correlation between spatio-temporally continuous holograms of adjacent viewpoints. In this case, the identical pixels between viewpoints may be found through warping based on a depth image. FIG. 9A corresponds to an RGB image and FIG. 9B corresponds to a depth image.

Figure 10:
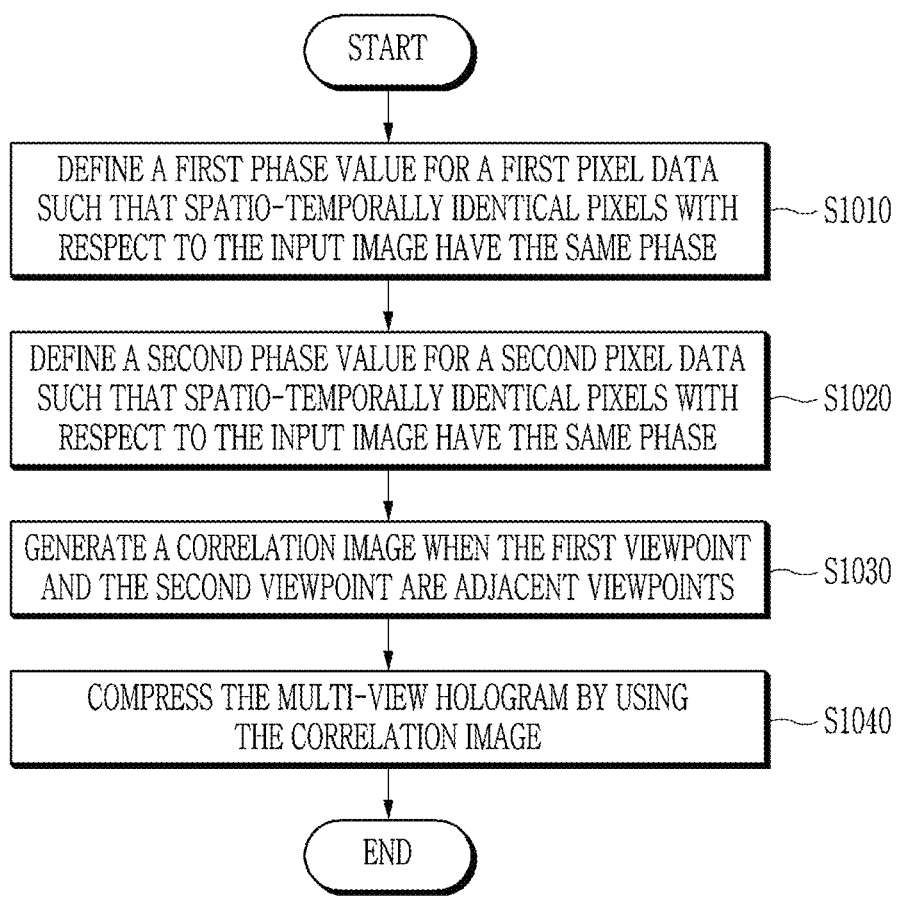
FIG. 10 to FIG. 11C are diagrams illustrating a method of generating and compressing a hologram according to an embodiment of the present disclosure.
Figure 11A:
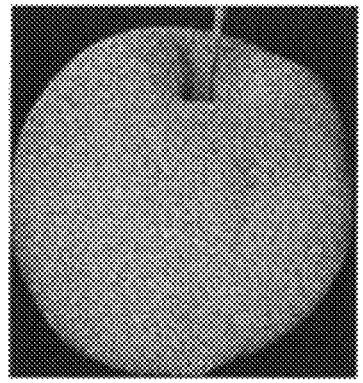
Figure 11B:
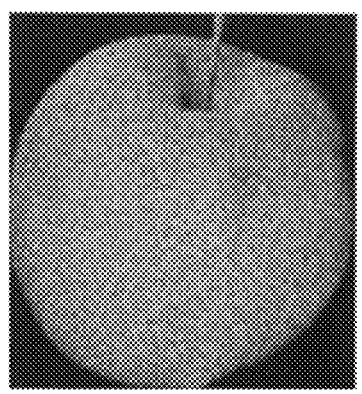
Figure 11C:
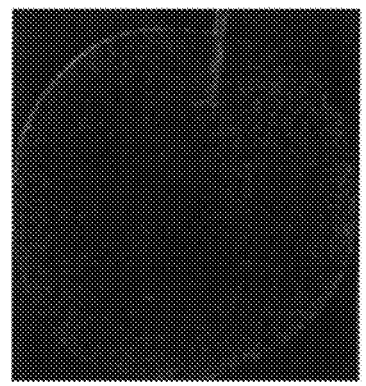

FIG. 10 to FIG. 11C are diagrams illustrating a method of generating and compressing a hologram according to an embodiment of the present disclosure.

Referring to FIG. 10, a method of generating and compressing a hologram according to an embodiment of the present disclosure may include defining a first phase value for a first pixel data so that spatio-temporally identical pixels with respect to the input image have the same phase (S1010)

In addition, the method may include defining a second phase value for a second pixel data so that spatio-temporally identical pixels with respect to the input image have the same phase (S1020).

That is, in a hologram that continuously moves in time or a hologram viewed as a multi-view, pixel data of pixels identified as being absolutely identical may have the same phase value. For example, pixel data of pixels identified as having the same three-dimensional absolute coordinates may be processed to have the same phase value.

In addition, the method may include when the first viewpoint and the second viewpoint are adjacent viewpoints, generating a correlation image (S1030). Here, the correlation image may be generated by assigning a first value (for example, 0) to the identical pixels between the first viewpoint and the second viewpoint, and a second value (for example, 1) to pixels that are not identical between the first viewpoint and the second viewpoint.

Referring to FIG. 11A to FIG. 11C together, FIG. 11A is an image of a first viewpoint, FIG. 11B is an image of a second viewpoint, and FIG. 11C is a correlation image with 0 assigned to the identical pixels between the first viewpoint and the second viewpoint, which are adjacent to each other;

1 assigned to pixels that are not identical between the first viewpoint and the second viewpoint. FIG. 11C shows that the correlation is very high.

Referring back to FIG. 10, the method may include compressing a multi-view hologram using a correlation image (S1040). For example, when encoding an image of a second viewpoint, the compression rate can be greatly improved by encoding a correlation image as shown in FIG. 11C, instead of the image of the second view as shown in FIG. 11B.

Figure 12:
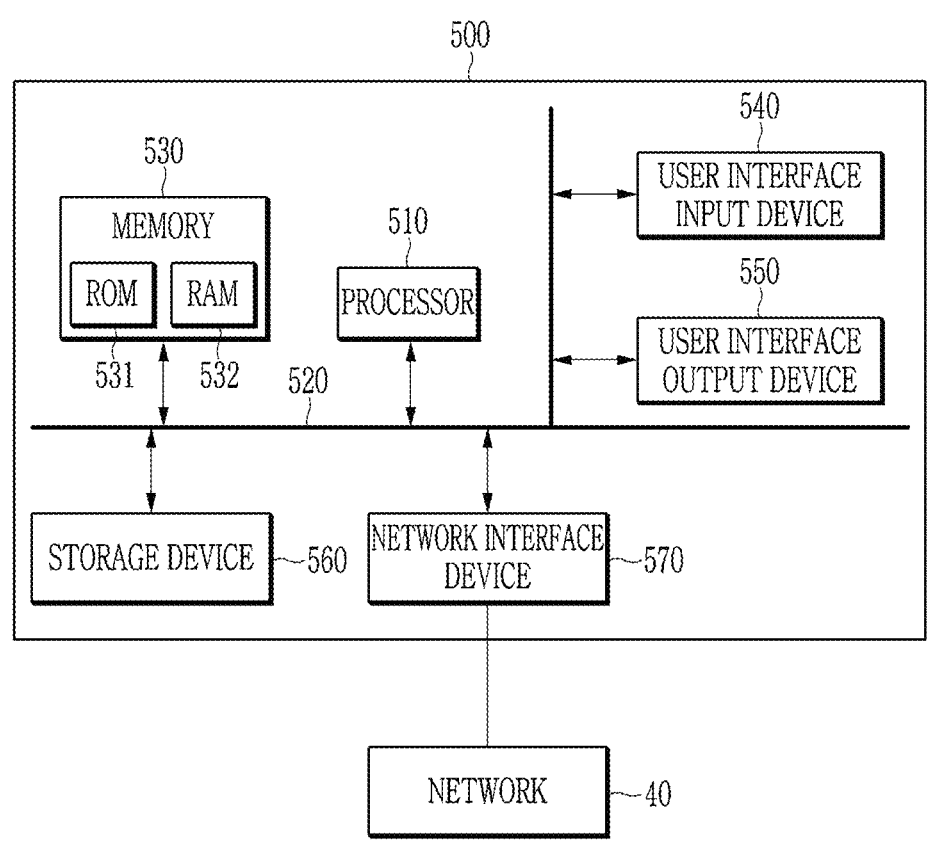
FIG. 12 is a block diagram illustrating a computing device for implementing an apparatus for generating a hologram and a method for generating a hologram according to embodiments of the present disclosure.

FIG. 12 is a block diagram illustrating a computing device for implementing an apparatus for generating a hologram and a method for generating a hologram according to embodiments of the present disclosure. Referring to FIG. 12, a apparatus for generating a hologram and a method for generating a hologram according to an embodiment of the present disclosure may be implemented using the computing device 500.

The computing device 500 may include at least one of a processor 510, a memory 530, a user interface input device 540, a user interface output device 550, and a storage device 560 communicating through a bus 520. The computing device 500 may also include a network interface 570 that is electrically connected to a network 40, for example, a wireless network. The network interface 570 may transmit or receive signals with other entities through the network 40.

The processor 510 may be implemented in various types, such as an application processor (AP), a central processing unit (CPU), a graphical processing unit (GPU), etc., and may be any semiconductor device which executes instructions stored in the memory 530 or the storage device 560. The processor 510 may be configured to implement the functions and methods described in FIGS. 1 to FIG. 11C.

The memory 530 and the storage device 560 may include various types of volatile or nonvolatile storage media. For example, the memory may include a read-only memory (ROM) 531 and a random access memory (RAM) 532. In one embodiment of the present disclosure, the memory 530 may be located inside or outside the processor 510, and the memory 530 may be connected to the processor 510 through various known means.

In addition, at least some of the hologram generating device and the hologram generating method according to embodiments of the present disclosure may be implemented as a program or software executed in the computing device 500, and the program or software may be stored in a computer-readable medium. have.

In addition, at least some of an apparatus for generating a hologram and a method for generating a hologram according to embodiments of the present disclosure may be implemented with hardware that can be electrically connected to the computing device 500.

According to the embodiments of the present disclosure described so far, in order to solve the problem of having a low correlation even between spatio-temporally consecutive holograms, when a hologram is generated from a 3D image, by defining the same phase value in the spatio-temporally identical pixels, the correlation between spatio-temporally continuous holograms can be increased. Specifically, by using the phase value, the correlation between temporally continuous holograms for one viewpoint, that is, the temporal correlation, can be increased, or the correlation between holograms of adjacent viewpoints for a multi-view, that is, the correlation among viewpoints can be increased.

In addition, according to an embodiment of the present disclosure, as the correlation between spatio-temporally continuous holograms increases, the hologram compression rate can be greatly improved by using this for hologram compression. For example, in multi-view hologram compression, a correlation image is generated by discriminating between identical pixels among viewpoints and pixels that are not identical among viewpoints, and the correlation image is used for compression, thereby improving the hologram compression rate.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

What is claimed is:

1. A method for generating a hologram, comprising:
   receiving an input image representing a 3D object;
   generating a plurality of pixel data for generating a hologram for the input image, each pixel data corresponding to each of a plurality of pixels of the hologram;
   defining a first phase value for a first one of the plurality of pixel data with respect to the input image such that spatio-temporally identical pixels have the same phase;
   defining a second phase value for a second one of the plurality of pixel data with respect to the input image such that spatio-temporally identical pixels have the same phase; and
   generating a multi-view hologram using the first phase value and the second phase value,
   wherein the spatio-temporally identical pixels include pixels that are continuously viewed in time for the input image and that are located in a same position in 3D volume space,
   wherein the defining of the first phase value comprises applying a first random phase to the first pixel data, and the defining of the second phase value comprises applying a second random phase to the second pixel data,
   wherein the first random phase and the second random phase are set such that the first phase value and the second phase value are the same, when the first random phase and second random phase are applied to the first pixel data and the second pixel data, respectively.

2. The method of claim 1, wherein the first pixel data comprises a first 3D coordinate information representing the 3D object, and a first RGB pixel information representing the 3D object, and the first phase value.

3. The method of claim 2, wherein the second pixel data comprises a second 3D coordinate information representing the 3D object, and a second RGB pixel information representing the 3D object, and the second phase value.

4. The method of claim 3, wherein the multi-view hologram comprises a single-view hologram.

5. The method of claim 1, further comprising:
   generating a correlation image by assigning a first value to the spatio-temporally identical pixels and a second value to pixels that are not spatio-temporally identical.

6. The method of claim 5, further comprising:
   compressing the multi-view hologram by using the correlation image.

7. The method of claim 1, wherein identical pixels among viewpoints are determined based on a depth image in an RGB Depth (RGBD)-based hologram generation method.

8. A method for generating a hologram, comprising:
   receiving an input image representing a 3D object;
   applying a first random phase to a first pixel data of a first viewpoint for the input image;
   applying a second random phase to a second pixel data of a second viewpoint for the input image;
   generating a multi-view hologram using the first pixel data and the second pixel data; and
   performing random phase modulation such that a result of applying the first random phase and the second random phase for identical pixels between the first viewpoint and the second viewpoint becomes the same phase value.

9. The method of claim 8, further comprising:
   when the first viewpoint and the second viewpoint are adjacent viewpoints, generating a correlation image by assigning a first value to the identical pixels between the first viewpoint and the second viewpoint, and a second value to pixels that are not identical between the first viewpoint and the second viewpoint.

10. The method of claim 9, further comprising:
    compressing the multi-view hologram by using the correlation image.

* * * * *